United States Patent
Khafizova

(10) Patent No.: US 9,235,645 B1
(45) Date of Patent: *Jan. 12, 2016

(54) SYSTEMS AND METHODS FOR MANAGING THE EXECUTION OF PROCESSING JOBS

(75) Inventor: Margarita Khafizova, Plano, TX (US)

(73) Assignee: Open Invention Network, LLC, Durham, NC (US)

( * ) Notice: Subject to any disclaimer, the term of this patent is extended or adjusted under 35 U.S.C. 154(b) by 932 days.

This patent is subject to a terminal disclaimer.

(21) Appl. No.: 12/770,944

(22) Filed: Apr. 30, 2010

Related U.S. Application Data

(60) Provisional application No. 61/317,741, filed on Mar. 26, 2010, provisional application No. 61/317,744, filed on Mar. 26, 2010, provisional application No. 61/317,793, filed on Mar. 26, 2010, provisional application No. 61/317,800, filed on Mar. 26, 2010, provisional application No. 61/317,812, filed on Mar. 26, 2010, provisional application No. 61/317,827, filed on Mar. 26, 2010.

(51) Int. Cl.
*G01F 15/16* (2006.01)
*G06F 17/30* (2006.01)

(52) U.S. Cl.
CPC ................ *G06F 17/30867* (2013.01)

(58) Field of Classification Search
CPC ...... G06Q 10/107; G06Q 10/06; H04L 51/26; G06F 17/30867; Y10S 707/99937
See application file for complete search history.

(56) References Cited

U.S. PATENT DOCUMENTS

| | | | |
|---|---|---|---|
| 3,965,484 A | 6/1976 | Matz et al. | |
| 5,287,194 A * | 2/1994 | Lobiondo | 358/296 |
| 5,337,258 A | 8/1994 | Dennis | |
| 6,466,935 B1 * | 10/2002 | Stuart | 1/1 |
| 6,714,960 B1 * | 3/2004 | Bitar et al. | 718/103 |
| 6,728,753 B1 | 4/2004 | Parasnis et al. | |
| 2004/0205458 A1 * | 10/2004 | Hwang et al. | 715/500 |
| 2004/0252333 A1 * | 12/2004 | Blume et al. | 358/1.15 |
| 2005/0210148 A1 * | 9/2005 | Kato et al. | 709/244 |
| 2006/0037051 A1 | 2/2006 | McDowell et al. | |
| 2006/0037053 A1 | 2/2006 | McDowell et al. | |
| 2006/0164677 A1 * | 7/2006 | Ahn | 358/1.15 |
| 2006/0206573 A1 * | 9/2006 | Horvitz et al. | 709/206 |
| 2007/0211280 A1 * | 9/2007 | Bansal et al. | 358/1.15 |
| 2007/0250777 A1 | 10/2007 | Chen et al. | |
| 2008/0255837 A1 | 10/2008 | Kahn et al. | |
| 2008/0256228 A1 * | 10/2008 | Fellenstein et al. | 709/223 |

(Continued)

OTHER PUBLICATIONS

Giovanni Novelli, Giuseppe Pappalardo, Corrado Santoro, Emiliano Tramontana, Technical Paper, "A Grid-based Infrastructure to Support Multimedia Content Distribution", 2007.

(Continued)

*Primary Examiner* — Peling Shaw
(74) *Attorney, Agent, or Firm* — Haynes and Boone, LLP

(57) ABSTRACT

The illustrative embodiments described herein provide systems and methods for managing the execution of processing jobs. In one embodiment, a method includes receiving a processing job associated with a set of processing job parameters. The processing job is sent from a user interfacing device associated with a user. The method also includes determining a processing job priority for the processing job using the set of processing job parameters, identifying a destination processing device capable of executing the processing job using the set of processing job parameters, and initiating execution of the processing job at the destination processing device to form processed data in response to determining to execute the processing job based on the processing job priority.

11 Claims, 10 Drawing Sheets

(56) References Cited

U.S. PATENT DOCUMENTS

2011/0007347 A1\* 1/2011 Kamath et al. ............... 358/1.15
2011/0022387 A1 1/2011 Hager
2011/0113333 A1 5/2011 Lee et al.
2012/0005034 A1 1/2012 Jarman et al.

OTHER PUBLICATIONS

Rakesh Mohan, John R. Smith, Chung-Sheng Li, Technical Paper, "Adapting Multimedia Internet Content for Universal Access", IEEE Transactions on Multimedia, vol. 1, No. 1, Mar. 1999.

Armando Fox, Steven D. Gribble, Yatin Chawathe, Eric A. Brewer, Technical Paper, "Adapting to Network and Client Variation Using Infrastructural Proxies: Lessons and Perspectives", IEEE Personal Communications, Aug. 1998.

Tu, Y.-C. Yan, J. Shen, G. Sunil Prabhakar, Technical Paper,— "Multiquality Data Replication in Multimedia Databases", IEEE Transactions on Knowledge and Data Engineering, vol. 19, No. 5, May 2007.

Smith, J.R. Mohan, R. Chung-Sheng Li, Technical Paper, "Transcoding Internet content for heterogeneous client devices", IEEE, 1998.

\* cited by examiner

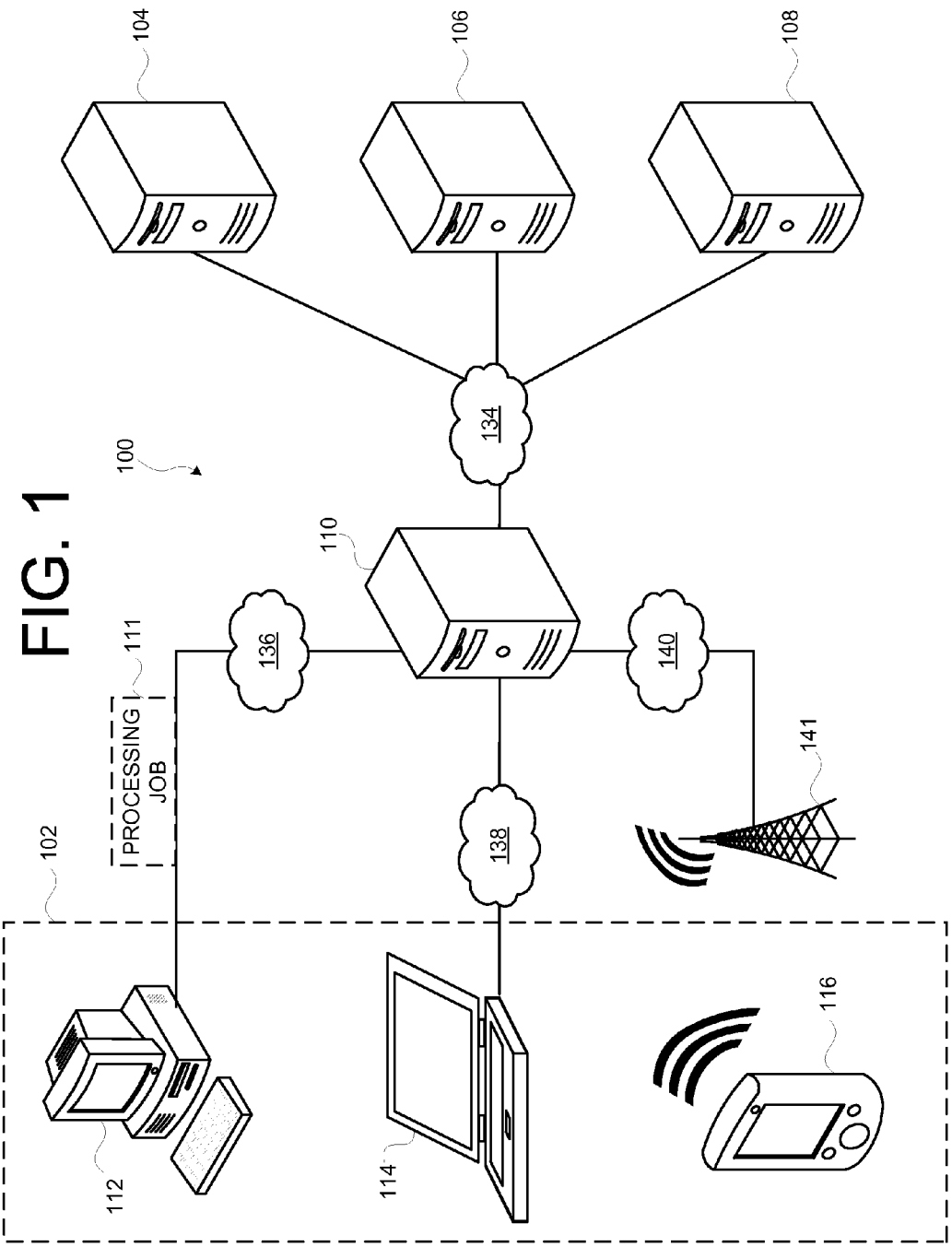

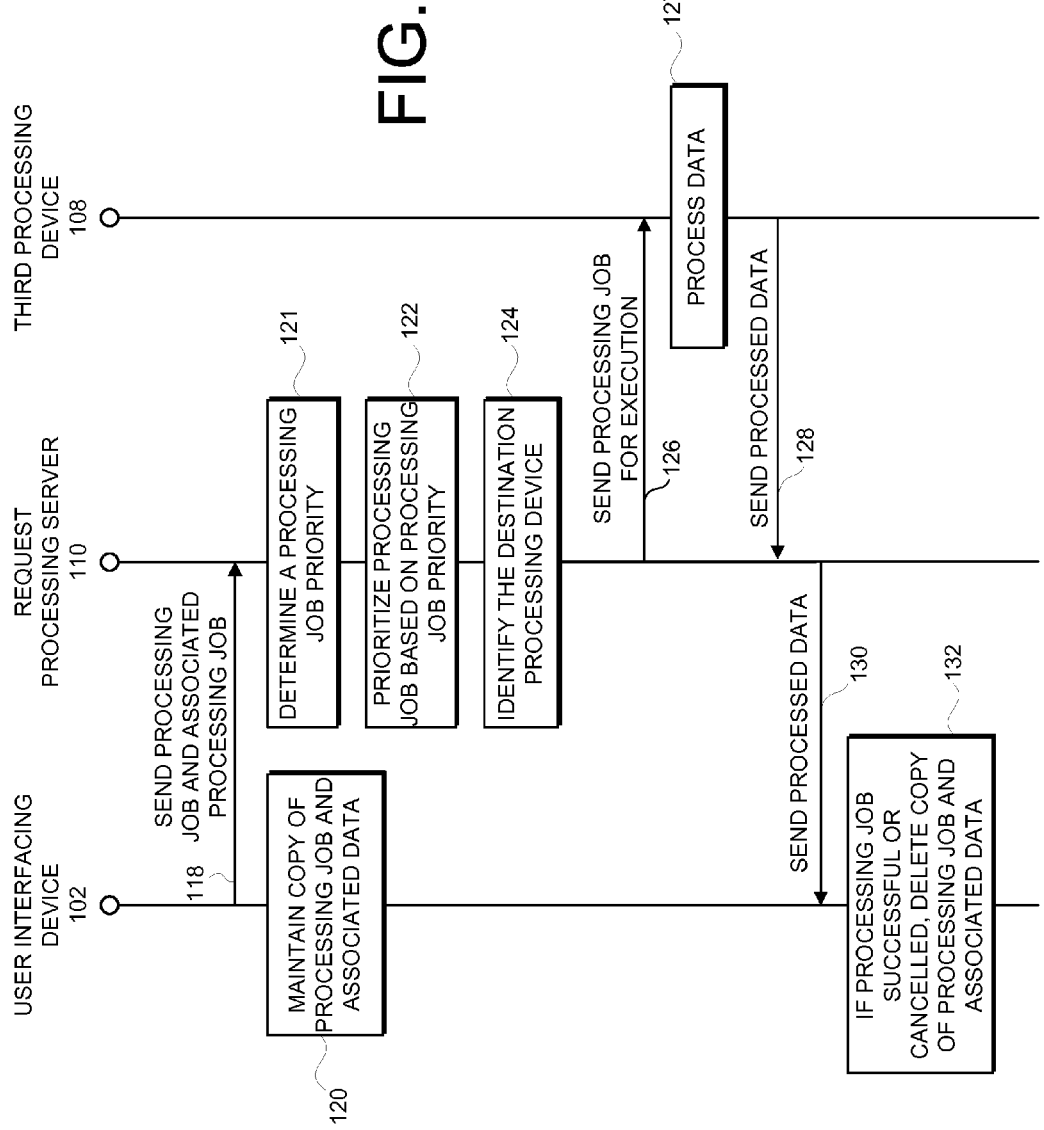

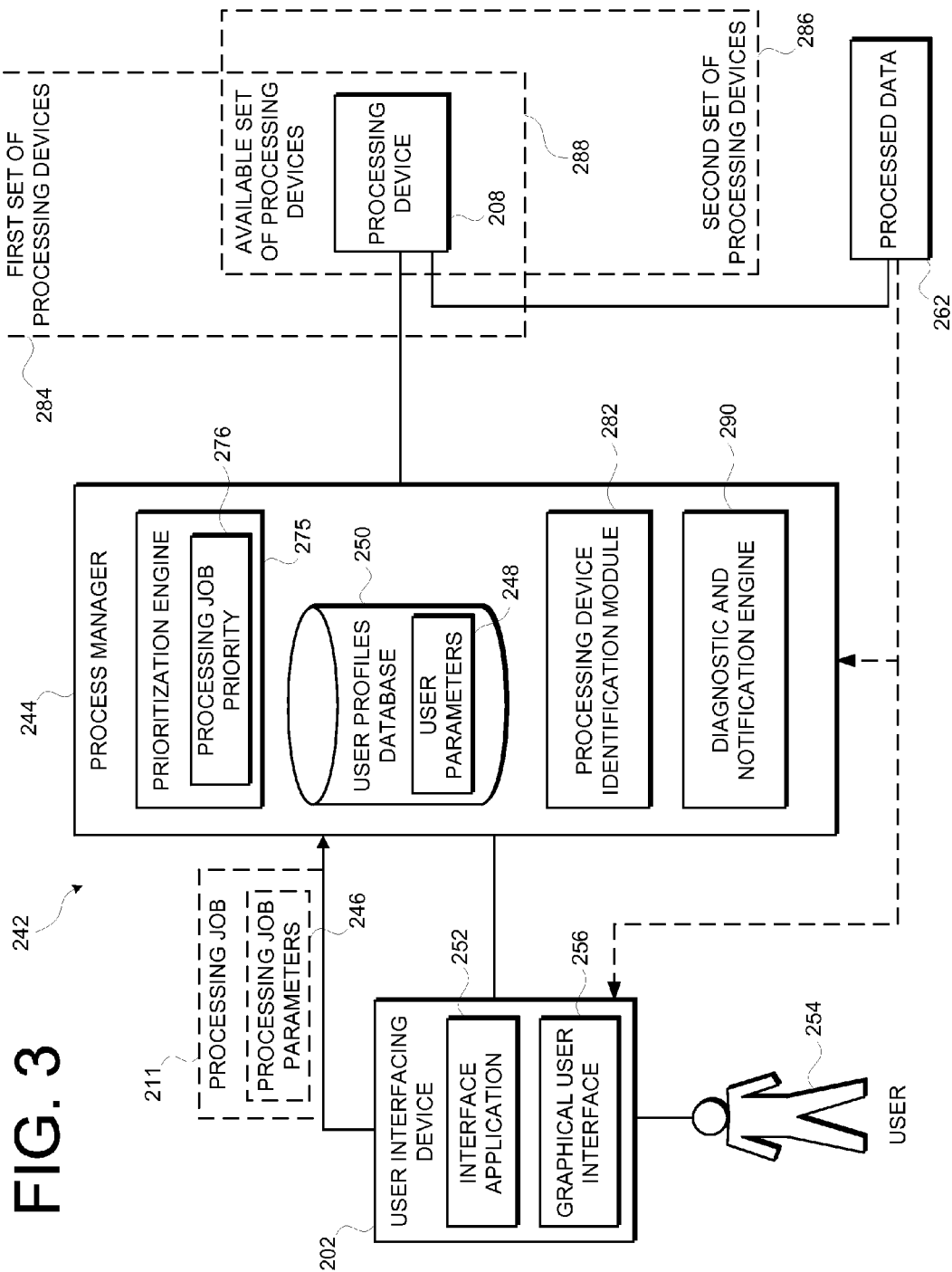

| PROCESSING JOB PARAMETER 246 | NUMERIC VALUE (N) | WEIGHT (W) | WEIGHTED VALUE (X) |
|---|---|---|---|
| SERVICE TYPE = PAID | 1000 | 1 | 1000 |
| NUMBER OF FILES/CLIPS = 3 | 3 | 1 | 3 |
| ESTIMATED DURATION OF PLAY (MINS) = 30 | 30 | 1 | 30 |
| AVI FORMAT? = YES | 2 | 5 | 10 |
| MP3 FORMAT? = NO | 0 | 2 | 0 |
| URGENCY LEVEL = LOW | 0 | 1 | 0 |
| PREFERRED COMPLETION TIME = 24 HOURS | 1 | 1 | 1 |
| USER INTERFACING DEVICE = CELL PHONE | 1 | 1 | 1 |
| PROXIMITY TO REQUEST PROCESSING SERVER = ZONE 3 | 3 | 1 | 3 |
| | | WEIGHTED TOTAL (T): | 1048 |

FIG. 4

| PROCESSING JOB NUMBER | PROCESSING JOB PRIORITY ($P_K$) | TIME REMAINING UNTIL EXPIRATION OF Z | PROCESS PENDING TIME PERIOD ($t_k$) | INDIVIDUAL UTILITY FACTOR ($I_k$) |
|---|---|---|---|---|
| 1 | 12 | 1 DAY | 4 DAYS | 12/5 |
| 2 | 10 | 3 DAYS | 2 DAYS | 6 |
| 3 | 5 | 5 DAYS | 0 DAYS | 5 |
| | | | $\Sigma I_K$: | 13.4 |
| | | | CUMULATIVE UTILITY FACTOR (F): | 14.4 |

FIG. 5

SYSTEMS AND METHODS FOR MANAGING THE EXECUTION OF PROCESSING JOBS

CROSS-REFERENCE TO RELATED APPLICATIONS

This application relates to U.S. Provisional Application Ser. No. 61/317,741, filed on Mar. 26, 2010 and U.S. application Ser. No. 12/753,163 filed on Apr. 2, 2010 and U.S. Ser. No. 12/753,167 filed on Apr. 2, 2010 and U.S. Ser. No. 12/753,171 filed on Apr. 2, 2010 and U.S. Ser. No. 12/753,180 filed on Apr. 2, 2010 and U.S. Provisional Application Ser. No. 61/317,744 filed on Mar. 26, 2010 and U.S. Provisional Application Ser. No. 61/317,793 filed on Mar. 26, 2010 and U.S. Provisional Application Ser. No. 61/317,800 filed on Mar. 26, 2010 and U.S. Provisional Application Ser. No. 61/317,812 filed on Mar. 26, 2010 and U.S. Provisional Ser. No. 61/317,827 filed on Mar. 26, 2010.

BACKGROUND

1. Field of the Invention

The present invention relates generally to systems and methods for managing the execution of processing jobs. More particularly, the present invention relates to managing processing jobs within a network data processing system.

2. Description of the Related Art

Network processing environments are often used to process data using multiple computing devices, and for the exchange of data between those devices. As the amount of data to be processed increases or as the available processing resources decrease in the network processing environment, users and processing jobs may have to compete for limited processing resources. Failing to prioritize multiple processing jobs competing for limited processing resources can result in processing delays, user frustration due to such delays, and other problematic issues. Current systems may also fail to prioritize processing jobs based on parameters that describe, or are otherwise associated, with those processing jobs. These current systems may also fail to take into account user or organizational preferences for prioritizing processing jobs.

SUMMARY

The illustrative embodiments described herein are directed to a data processing system and, in particular, to systems and methods for managing the execution of processing jobs. In one embodiment, a method includes receiving a processing job associated with a set of processing job parameters. The processing job is sent from a user interfacing device associated with a user. The method also includes determining a processing job priority for the processing job using the set of processing job parameters, identifying a destination processing device capable of executing the processing job using the set of processing job parameters, and initiating execution of the processing job at the destination processing device to form processed data in response to determining to execute the processing job based on the processing job priority.

In another embodiment, the method includes receiving a processing job associated with a set of processing job parameters. The processing job is sent from a user interfacing device associated with a user. The method includes associating each of the set of processing job parameters with a respective numeric value (N), assigning a respective weight (W) to each of the set of processing job parameters, determining a respective weighted value (X) for each of the set of processing job parameters, wherein $X = W \cdot N$. The method also includes summating the respective weighted values (X) for each of the set of processing job parameters to form a weighted total (T), determining a cumulative utility factor (F) associated with the user, and determining a processing job priority (P) for the processing job, wherein $P = T/F$. The method includes initiating execution of the processing job at a destination processing device using the processing job priority (P).

In another embodiment, a data processing system includes a bus system and a memory connected to the bus system. The memory includes a set of instructions. The data processing system includes a processing unit connected to the bus system. The processing unit executes the set of instructions to receive a processing job associated with an unconverted file and a set of processing job parameters. The processing job is sent from a user interfacing device associated with a user. The processing unit also executes the set of instructions to determine a processing job priority based on the set of processing job parameters, identify a destination processing device capable of converting the unconverted file using the processing job priority, initiate conversion of the unconverted file into a converted file at the destination processing device, and receive the converted file.

BRIEF DESCRIPTION OF THE DRAWINGS

FIG. 1 is a schematic, pictorial representation of a network data processing system for managing the execution of processing jobs according to one illustrative embodiment;

FIG. 2 is a schematic diagram showing an illustrative embodiment of the interaction between components of a system for managing the execution of processing jobs;

FIG. 3 is a schematic, block diagram of a processing job management system according to an illustrative embodiment;

FIG. 4 is a table containing processing job parameters, as well as values associated therewith, according to an illustrative embodiment;

FIG. 5 is a table containing the job number, job priority, and other values describing a set of pending processing jobs associated with a user according to an illustrative embodiment;

DETAILED DESCRIPTION

Figure 6:
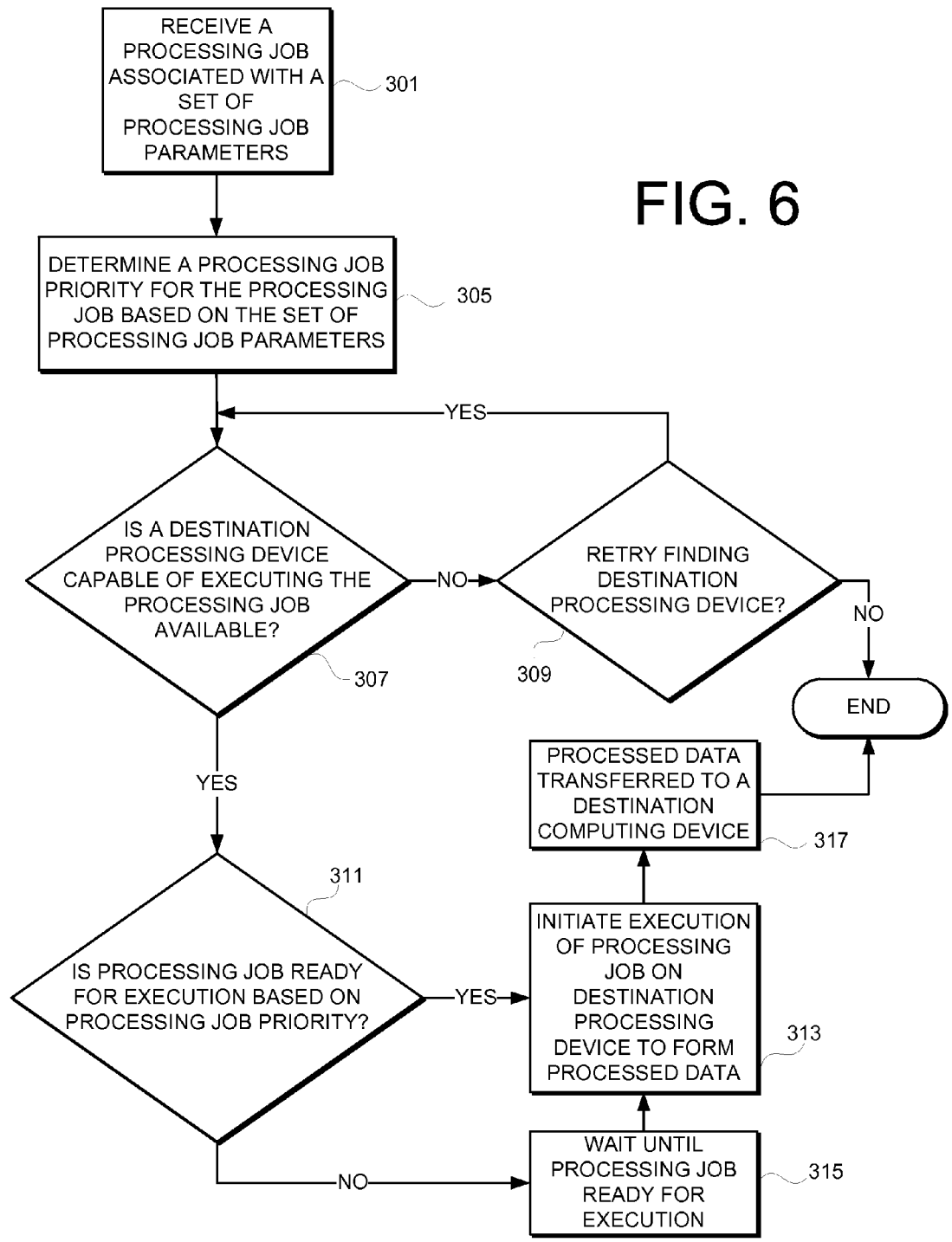
FIG. 6 is a schematic flowchart of a process for managing the execution of processing jobs according to an illustrative embodiment.

Referring to FIGS. 1 and 2, an illustrative embodiment of a processing network 100 includes user interfacing devices 102 that are in data communication with a first processing device 104, a second processing device 106, and a third processing device 108 via a request processing server 110. The user interfacing devices 102 may include any device capable of sending, or otherwise initiating, a processing job. Unless otherwise indicated, as used herein, "or" does not require mutual exclusivity. A processing job may include any files, instructions, tasks, or other data that is sendable for processing by a processor or other device. One non-limiting example of a processing job includes instructions to convert an audio, video, or multimedia file into a different format or size. In the non-limiting example of FIG. 1, the user interfacing devices 102 include a desktop computer 112, a laptop computer 114, and a cellular phone 116. Other non-limiting examples of the user interfacing devices 102 include smart phones, walkie talkies, netbooks, personal digital assistants, mini-computers, digital music players, portable gaming devices, web browsing devices, etc. Also, any number of processing devices or user interfacing devices, of any type, may be included in the processing system 100.

In one embodiment, the user interfacing devices 102 send one or more processing jobs 111 to the request processing server 110, which may then prioritize the incoming processing jobs using one or more parameters that are associated with the processing job 111. In the non-limiting example of FIG. 1, the desktop computer 112 is shown to be sending the processing job 111 to the request processing server 110, although the processing job 111 may originate from any of the user interfacing devices 102. In addition to prioritizing the processing jobs received from the user interfacing devices 102, the request processing server 110 may also identify a destination processing device based on parameters associated with the incoming processing jobs, the processing job priority accorded to any one of the incoming processing jobs, or other factors.

With particular reference to FIG. 2, an illustrative embodiment of the interaction between the components of FIG. 1 is shown in which the user interfacing devices 102 (e.g., the desktop computer 112) send the processing job 111 and associated processing job parameters to the request processing server 110 (data communication 118). Processing job parameters include any data describing, or otherwise associated, with the processing job 111. In another embodiment, the processing job 111 may also be associated with user parameters. User parameters include any data describing, or otherwise associated, with a user of the user interfacing device sending the processing job 111. Processing job parameters and user parameters are described in further detail below, with reference to specific non-limiting examples.

After sending the processing job 111, the user interfacing device 102 may retain a copy of the processing job 111 and any associated data in storage, including the associated processing job and user parameters (process 120). After receiving the processing job 111 and any associated parameters, the request processing server 110 may then determine a processing job priority for the processing job (process 121). The request processing server 110 may use the processing job parameters or user parameters associated with the processing job 111 in order to determine the processing job priority. If other processing jobs are currently pending in the processing network 100, the request processing server 110 may then prioritize the processing job 111 relative to the other pending processing jobs to determine an execution order for scheduling the processing jobs (process 122). In process 122, the request processing server 110 may prioritize the pending processing jobs using the respective processing job priorities of the pending processing jobs. For example, pending processing jobs with the highest processing job priorities may be scheduled to be executed first in the execution order, while pending processing jobs with the lowest processing job priorities may be scheduled to be executed last in the execution order. Additional details regarding the determination of the processing job priority for a particular processing job, as well as the prioritization of processing jobs based on the processing job priority, will be described in further detail below.

The request processing server 110 may also identify a destination processing device at which to initiate execution of the processing job 111 (process 124). In the example of FIGS. 1 and 2, the third processing device 108 is identified to be the destination processing device. The identification of the destination processing device in process 124 may occur in parallel or in series with the processes 121 or 122. Also, the identification of the destination processing device may be performed using the processing job or user parameters associated with the processing job 111. The processing job priority of the processing job 111 may also be used to identify the destination processing device. For example, the third processing device 108 may be identified in response to a determination that the processing job 111 is ready to be scheduled based on the processing job priority of the processing job 111. In this example, the third processing device 108 may be identified to execute the processing job 111 because the third processing device 108 is immediately available to execute the processing job 111. Additional details regarding identifying the destination processing device are described below.

In one embodiment, after identifying the third processing device 108 as the destination processing device, the request processing server 110 sends the processing job 111 to the third processing device 108 for execution (data communication 126). The processing job 111 may also be sent to the third processing device 108 from a source other than the request processing server 110, in which case the request processing server 110 initiates execution of the processing job 111 at the third processing device 108.

The third processing device 108 then processes the data sent from the request processing server 110 (process 127). In one specific non-limiting example, the data sent from the request processing server 110 may include an unconverted file, and the third processing device 108 may convert the unconverted file to form a converted file in process 127. Depending upon whether the third processing device 108 successfully executes the processing job 111, the third processing device 108 may send the processed data, such as the converted file, to the request processing server 110 (data communication 128). The request processing server 110 may then send the processed data to the user interfacing device 102 (data communication 130). In another embodiment, the third processing device 108 may send the processed data to any computing device other than the user interfacing device 102, and such computing device may be indicated by the processing job parameters.

In one embodiment, as described in further detail below, the request processing server 110, when informed that the processing job 111 was not successfully executed, may determine a cause for the failure of the processing job 111 to be properly processed. The request processing server 110 may then notify the user of the cause for failure, or may analyze the cause for failure and send a suggested action to the user. In another embodiment, the request processing server 110 notifies the user interfacing device 102 of the cause for failure, and the user interfacing device 102 may analyze the cause for failure and notify the user of a suggested action.

If the user interfacing device 102 is notified that the processing job 111 was successfully executed, the user interfacing device 102 may delete the processing job 111 and any associated data that resides on the user interfacing device 102.

The user interfacing device 102 may also delete the processing job 111 and associated data if the processing job 111 was canceled by the user (process 132).

The illustrative embodiments may be used to accommodate the scheduling of processing jobs when the number of processing devices, or other processing resources, is relatively limited. Further, the illustrative embodiments may be used to schedule processing jobs using definable settings that reflect the prioritization and processing preferences of a user, organization, or other entity that manages processing jobs within a processing network. Indeed, the illustrative embodiments may be used in any number of ways to accommodate a wide variety of purposes.

The techniques, technologies, or media by which the components of the processing network 100 intercommunicate are numerous. For example, the processing network 100, or any portion thereof, may be part of a personal area network (PAN), a local area network (LAN), a campus area network (CAN), a metropolitan area network (MAP), or any other network type. Also, data communication medium 134 between the request processing server 110 and each of the first processing device 104, the second processing device 106, and the third processing device 108, respectively, may be any medium through which data can be communicated. For example, the data communication medium 134 may be wired or wireless data connections, and may utilize a virtual private network (VPN), multi-protocol label switching (MPLS), the Internet, or any other data communication media. In addition, the request processing server 110 may communicate with each of the first processing device 104, the second processing device 106, and the third processing device 108 using a separate or different medium.

The data communication media 136, 138, and 140 between the request processing server 110 and each of the desktop computer 112, the laptop computer 114, and the base station 141, respectively, may be of the same or similar type as any of the non-limiting examples provided for the data communication medium 134. In addition to the request processing server 110, additional intervening servers may facilitate data communication between the user interfacing devices 102 and the first, second, and third processing devices 104, 106, and 108. In one embodiment, the intervening servers may store one or more files (e.g., an unconverted file) associated with the processing job 111, and the file may be retrieved from these intervening servers so that the file may be processed or converted. In another embodiment, the file to be processed, as indicated by the processing job 111, may be sent along with the processing job 111 to the request processing server 110. Wireless communication between the cellular phone 116 and the base station 141 may utilize any wireless standard for communicating data, such as CDMA (e.g., cdmaOne or CDMA2000), GSM, 3G, Edge, an over-the-air network, Bluetooth, etc.

In one example, the processing network 100 may utilize the Internet, with any combination of the data communication media 134, 136, 138, and 140 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. FIG. 1 is intended as an example, and not as an architectural limitation for the different illustrative embodiments.

Referring to FIGS. 3-5, an illustrative embodiment of a processing job management system 242 includes a process manager 244 that receives the processing job 211 from the user interfacing device 202. The process manager 244 prioritizes the processing job 211 relative to other pending processing jobs managed by the processing job management system 242. The process manager 244 may also initiate execution of the processing job 211 at the destination processing device 208, which is identified by the process manager 244. Components of FIG. 3 that are analogous to components in FIGS. 1 and 2 have been shown by indexing the reference numerals by 100. The process manager 244 may be implemented by a request processing server, such as the request processing server 110 in FIG. 1, or may be implemented by the user interfacing device 202.

The user interfacing device 202 may send the processing job 211 to the process manager 244 along with one or more processing job parameters 246. One or more user parameters 248 may also be sent from the user interfacing device 202 to the process manager 244. In another embodiment, the process manager 244 may access a user profiles database 250 to retrieve the user parameters 248.

In one embodiment, the processing job parameters 246 or the user parameters 248 are determined or defined, at least in part, by an interface application 252. The interface application 252 may be included as part of another application, such as a word processor, a graphical-related application, a spreadsheet application, a Web browser, a media player, or other application. The interface application 252 may also be a separate application that works in conjunction with another application. The interface application 252 may prompt a user 254, using the graphical user interface 256, to input the processing job parameters 246 or the user parameters 248.

Examples of processing job parameters 246 are numerous, and several examples follow. Non-limiting examples of the processing job parameters 246 include a format into which a file associated with the processing job 211 should be converted, a size to which a file associated with the processing job 211 should be converted, whether the service processing the processing job is a paid service or free service, the number of files or clips to be processed, the play duration of any files to be converted, the urgency level of the processing job, the proximity of the user interfacing device 202 to a particular server, the type of user interfacing device 202, etc. In another example, the processing job parameters 246 may include a preferred completion time, which indicates a time by which to execute the processing job 211. The preferred completion time may be defined as an amount of time from the present by which to execute the processing job 211 (e.g., five seconds, two hours, two days, two weeks, etc. . . . ), or as a date and time by which to execute the processing job 211 (e.g., 3/1/2013, 11:30 am, Wednesday, etc.).

The processing job parameters 246 may indicate a type of processing device on which the processing job 211 should be executed, such as a computer type, processor type, server type, etc. The processing job parameters 246 may also include, or otherwise indicate, the urgency of the processing job 211. The urgency may be selected by the user 254, or may be pre-defined based on another processing job parameter or user parameter. In another embodiment, the processing job parameters 246 may indicate a location of the user interfacing device 202. For example, the processing job parameters 246 may indicate a particular "zone" in which the user interfacing device 202 is located, and this zone may be used to identify the destination processing device 208 that is proximate the user interfacing device 202. In one example, the user interfacing device 202 may be in any one of multiple zones, and each of the zones may correspond to a range of distance from a request processing server or processing device (e.g., 0-5 feet, 6-20 feet, 21-40 feet, etc.).

In one specific non-limiting example, the interface application 252 may allow the user 254 to determine how to convert a file associated with the processing job 211 by allowing the user 254 to define the processing job parameters 246. For example, the user 254 may input, into the interface application 252, that he or she would like to convert a video, audio, or multimedia file into a specific format (e.g., avi, mp3, jpg, etc. . . . ) or size (e.g., 2 KB, 1 MB, 1 GB, etc. . . . ). The files, once converted, may be compiled on the user interfacing device 202 for use by the user 254.

Examples of user parameters 248 are also numerous, and several examples follow. Non-limiting examples of the user parameters 248 include a user ID associated with the user, an organizational department to which the user belongs, the organizational rank of the user, a project on which the user is working, a type of project on which the user is working, etc.

In one embodiment, the processing job parameters 246 and the user parameters 248 are stored in either or both of the user interfacing device 202 or the process manager 244. In this example, the processing job parameters 246 or the user parameters 248 may be stored as default settings so that the user 254 does not have to indicate the processing job parameters 246 and the user parameters 248 each time a processing job is initiated.

Any other processing job data that describes any aspect of the processing job 211 may also be included with the processing job parameters 246. Likewise, the user parameters 248 may include any data that describes, or otherwise relates, to the user 254 or the user interfacing device 202, such as the processing preferences of the user 254, passwords to access a particular processing device, any type of user identification data, user financial information, the specific type of user interfacing device (e.g., laptop, cell phone, etc.), or any other user or device-related data.

In one embodiment, a prioritization engine 275 determines a processing job priority 276 using the processing job parameters 246 and/or the user parameters 248. The processing job priority 276 may be used to prioritize the processing job 211 relative to other pending processing jobs managed by the process manager 244. The determination of the processing job priority 276 by the prioritization engine 275 is described with reference to the table 277 in FIG. 4. The table 277 is a specific and non-limiting example of the parameters and values that may be used to calculate the processing job priority 276. The parameters and values shown in the table 277 may be varied, added to, or subtracted from in numerous ways that would alter the determination of the processing job priority 276. Also, in the table 277, the processing job being prioritized relates to the conversion of a file, such as an audio, video, or multimedia file. However, any type of processing job may be prioritized, or otherwise managed, by the illustrative embodiments, such as processing jobs to calculate data, render images, manipulate data, create data, analyze data, send data, encode data, etc.

In one illustrative embodiment, the prioritization engine 275 assigns, or otherwise associates, each of the processing job parameters 246 and the user parameters 248 with a respective numeric value N. The numeric value N is indicative of the processing job parameter 246 or the user parameter 248. For example, for the service type parameter shown in the table 277, the respective numeric value N may differ depending on whether the service is free or requires payment. In the example of the table 277, the numeric value N of one thousand (1000) is assigned to indicate that the service must be paid. By way of illustration, if the service if free, the numeric value N may be zero (0).

By way of further example, the numeric value N of three (3) has been assigned to the number of files/clips parameter because the processing job includes three files to be converted. In the example of the table 277, several other numeric values N have been assigned to corresponding processing job parameters 246. For example, a numeric value N of thirty (30) has been assigned to the estimated duration of play parameter to indicate a play time of thirty (30) minutes, a numeric value N of two (2) has been assigned to the AVI format parameter to indicate that the file is to be converted into AVI format, a numeric value N of zero (0) has been assigned to the MP3 format parameter to indicate that the file is not to be converted into MP3 format, a numeric value N of zero (0) has been assigned to the urgency level parameter to indicate a low urgency level, a numeric value N of one (1) has been assigned to the preferred completion time parameter to indicate a preferred completion time of 24 hours, a numeric value N of one (1) has been assigned to the user interfacing device parameter to indicate that a cell phone is the user interfacing device 202, and a numeric value N of three (3) has been assigned to the proximity to request processing server parameter to indicate that the user interfacing device 202 is located in zone three. In one embodiment, the higher the numeric value N that is assigned to the processing job parameter 246 or user parameter 248, the more weight that processing job parameter or user parameter will be accorded when determining the processing job priority 276.

The prioritization engine 275 may also assign a weight W to each of the processing job parameters 246 and the user parameters 248. The weight W may be used to determine the impact that each of the processing job parameters 246 and the user parameters 248 will have on the processing job priority 276. For example, the higher the weight W is for a particular processing job or user parameter, the more that processing job or user parameter will cause the processing job priority 276 to have a higher value. The weights W for each processing job and user parameter may be preconfigured to reflect the preferences of any user or entity managing processing jobs using the process manager 244. For example, processing job or user parameters that the user or entity considers important when prioritizing the processing job 211 may assign those particular processing job or user parameters a higher weight W.

In the example of the table 277, the AVI format parameter and the MP3 format parameter have been given respective weights W of five (5) and two (2), respectively, which are the highest weights W in the table 277. Thus, the AVI format parameter and the MP3 format parameter may be considered by an administrator to be the most important in determining the processing job priority 276. However, the importance of a particular processing job parameter or user parameter may also be reflected by the numeric value N assigned to that parameter. For example, the numeric value N of one thousand (1000) assigned to the service type parameter reflects the importance placed on the fact that the service type is a paid service.

In another embodiment, the weights W of one or more of the processing job parameters 246 or the user parameters 248 may be dynamically adjusted in real time to reflect current circumstances, such as the availability of processing devices with certain capabilities, the importance of the project that the user 254 is currently working on, etc.

The prioritization engine 275 may also determine a weighted value X for each of the processing job parameters 246 or the user parameters 248 by multiplying the respective numeric value N by the respective weight W for each of the processing job parameters 246 or user parameters 248. Thus, as expressed in formulaic, or symbolic, terms, X=W·N. By way of representative example in the table 277, the respective weighted value X for the service type parameter is determined to be one thousand (1000), which is the product of the respective numeric value N of one thousand (1000) and the respective weight W of one (1). By way of further example, the weighted value X of the proximity to request processing server parameter is determined to be three (3), which is the product of the respective numeric value N of three (3) and the respective weight W of one (1).

The prioritization engine 275 may then determine a weighted total T by summing the weighted values X for all of the processing job parameters 246 and the user parameters 248, or T=ΣX. In the example of the table 277, the weighted values X of the processing job parameters 246 add up to equal a weighted total T of 1048.

In one embodiment, the weighted total T may be used as the processing job priority 276. In one such example, the weighted total T may be used as the processing job priority 276 when the user 254 has no pending processing jobs other than the processing job 211. In this example, if the user 254 has no pending processing jobs other than the processing job 211, then the processing job priority 276 is equal to the weighted total T. Thus, the processing job priority 276 may equal the weighted total T of 1048 if the user 254 has no pending processing jobs other than the processing job 211.

In some cases, the user 254 may have initiated processing jobs other than the processing job 211, and which are currently pending. In this situation, the weighted total T may still be used as the processing job priority 276. However, in one embodiment, the prioritization engine 275 may determine a cumulative utility factor F for the user 254, and divide the weighted total T by the cumulative utility factor F to equal the processing job priority 276. The cumulative utility factor F, in one embodiment, is a fairness mechanism that adjusts the processing job priority 276 based on the processing jobs that the user 254 has initiated other than the processing job 211. In this embodiment, the cumulative utility factor F may be used to prevent the user 254 from over-utilizing the processing devices in the processing job management system 242 at the expense of other users.

In one embodiment, to calculate the cumulative utility factor F, the prioritization engine 275 identifies the pending and prioritized processing jobs 279 that have been initiated by the user 254. The pending and prioritized processing jobs 279 are one or more pending processing jobs initiated by the user 254 other than the processing job 211. For purposes of illustration only, determination of the cumulative utility factor F is described with reference to FIG. 5, which includes a table 278 of pending and prioritized processing jobs 279 initiated by the user 254. The table 278 includes data about each of the pending and prioritized processing jobs 279. In particular, the table 278 includes the processing job number, the processing job priority $P_K$, the time remaining until the expiration of a predetermined time period Z, and the process pending time period $t_K$ for each of the pending and prioritized processing jobs 279. Z is a predetermined time period that may be selected or defined by a user or entity that is using the process manager 244 to manage processing jobs. In the non-limiting example of the table 278, the predetermined time period Z is equal to five days. However, the predetermined time period Z may be on the order of seconds, minutes, weeks, months, or any other time. The process pending time period $t_K$ is an amount of time that the respective pending and prioritized processing job 279 has been pending.

In one embodiment, the data for the pending and prioritized processing jobs 279, such as the data in the table 278, may be retrieved using a unique identifier UI for the user 254. The unique identifier UI for the user 254 may include a user ID for the user 254, the department of the user 254, the location of the user 254, or other user data or parameters. When finding processing jobs initiated by the user 254, the prioritization engine 275 may search for the pending and prioritized processing jobs 279 using the user's unique identifier UI, which may be included with, or otherwise associated with, each of the pending and prioritized processing jobs 279.

The prioritization engine 275 determines an individual utility factor $I_K$ for each of the pending and prioritized processing jobs 279, wherein $I_K=P_K(Z-t_K)/Z$. In one example, the respective individual utility factor $I_K$ for each of the pending and prioritized processing jobs 279 may be determined in accordance with the equation $I_K=P_K(Z-t_K)/Z$ by dividing a respective processing job priority $P_K$ by the predetermined time Z to form a first intermediate value. A second intermediate value may be determined by subtracting the respective process pending time period $t_K$ for the pending and prioritized processing job from the predetermined time Z. The second intermediate value may also be determined by identifying an amount of time remaining until the pending and prioritized processing job has been pending for the predetermined time Z; such an amount of time is shown in the column of the table 278 labeled "Time remaining until expiration of Z". The individual utility factor $I_K$ for each of the pending and prioritized processing jobs 279 may then be determined by multiplying the first intermediate value by the second intermediate value for each of the pending and prioritized processing jobs 279. In one embodiment, the individual utility factor $I_K$ for a particular processing job may be zero (0) if the process pending time period $t_K$ is greater than or equal to the predetermined time Z.

In the example of the table 278, the individual utility factors $I_K$ for processing job numbers one (1), two (2), and three (3) are 12/5, six (6), and five (5), respectively. The individual utility factors $I_K$ for the pending and prioritized processing jobs 279 may then be summated, and then incremented by one (1) to form the cumulative utility factor F. In one example, the cumulative utility factor F may be expressed as: $F=1+\Sigma_{n=1}^{K} I_K$, wherein K is the number of pending and prioritized processing jobs 279. The number of pending and prioritized processing jobs K may be determined by the prioritization engine 275. In the non-limiting example of the table 278, the number of pending and prioritized processing jobs K is equal to three (3), and the cumulative utility factor F is 14.4.

More recently-submitted processing jobs may have a greater impact on increasing the cumulative utility factor F, and thus have a greater impact on decreasing the processing job priority 276. In the example of FIG. 5, processing jobs submitted today will contribute their full processing job priority $P_K$ to the cumulative utility factor F, while processing jobs submitted Z/2 days ago may contribute only half of their processing job priority $P_K$ to the cumulative utility factor F. Processing jobs submitted more than Z days ago may have no contribution at all to the cumulative utility factor F.

The weighted total T for the processing job 211 may then be divided by the cumulative utility factor F associated with the user 254 to form the processing job priority 276. In the non-limiting example of FIGS. 4 and 5, the weighted total T of 1048 is divided by the cumulative utility factor F of 14.4 to equal 72.78. Thus, in the example of FIGS. 4 and 5, the processing job priority 276 is 72.78.

In one embodiment, the prioritization engine 275, upon determining the processing job priority 276 for the processing job 211, may prioritize the processing job 211 relative to the other pending processing jobs managed by the process manager 244. These other pending processing jobs may include processing jobs that are initiated by the user 254, and those that are not. In one example, the prioritization engine 275 may determine an execution order for the pending processing jobs by comparing the respective processing job priorities for all of the pending processing jobs managed by the process manager 244. In this example, the pending processing jobs may be arranged in descending order based on the processing job priorities so that the pending processing jobs with higher processing job priorities are scheduled to be executed before those with lower processing job priorities. Thus, if the processing job priority 276 of the processing job 211 is greater than a processing job priority of another processing job that is pending in the process manager 244, then the processing job 211 will be scheduled to be executed prior to the other processing job.

The position of the processing job 211 in the execution order, or queue, may be displayed to the user 254 using a prompt on the graphical user interface 256. The prompt may also display a processing job identifier of the processing job 211, and may allow the user 254 to view the execution order, or queue, in which the processing jobs managed by the process manager 244 are scheduled. The prompt may also allow the user 254 to refresh the display to reflect changes in the execution order of the processing jobs over time.

In one embodiment, a processing device identification module 282 identifies the destination processing device 208 on which the processing job 211 is to be executed. For example, once the process manager 244 determines to execute the processing job 211 based on the processing job priority 276, and resultant position in the execution order, the processing device identification module 282 may then identify the destination processing device 208 that is capable of performing the processing job 211 based on the user parameters 248 and the processing job parameters 246 associated with the processing job 211. By way of example, if the processing job 211 is so large that a processor having a minimum threshold speed should be used for processing, then the processing device identification module 282 identifies the destination processing device 208 that has the minimum threshold speed. By way of further example, if the processing job parameters 246 indicate a preferred completion time of 48 hours from the time the processing job 211 is initiated, the prioritization engine 275 may prioritize the processing job 211 accordingly, and the processing device identification module 282 may identify the destination processing device 208 that is capable of executing the processing job 211 prior to, or at, the preferred completion time of 48 hours from the time of initiation.

In another embodiment, each of the potential processing devices that are evaluated by the processing device identification module 282 has a respective load. The load is an amount of time that it would take for the respective processing device to complete execution of the processing jobs that are scheduled for that respective processing device. Thus, when the processing job 211 is scheduled for execution, as determined by the processing job priority 276, the processing device identification module 282 may identify the destination processing device 208 with the lowest load. Identifying the destination processing device 208 with the lowest load enables the processing job 211 to be executed as quickly as possible upon being scheduled for execution.

In another embodiment, the processing device identification module 282 may identify two or more sets of processing devices based on differing criteria, and identify a destination processing device that is included in each of these identified sets of processing devices. For example, the processing device identification module 282 may identify a first set of processing devices 284 that is capable of performing the processing job 211 based on the processing job parameters 246 and the user parameters 248. For example, if the processing job parameters 246 indicate that the processing job 211 is a file conversion to be converted by a paid service, the processing device identification module 282 may identify a first set of processing devices 284 that is able to process jobs for the paid service.

The processing device identification module 282 may also identify a second set of processing devices 286 that is able to execute the processing job 211 based on the processing job priority 276 of the processing job 211. For example, if the processing job priority 276 is a large value when compared to the other processing job priorities of the other pending processing jobs in the process manager 244, the processing device identification module 282 may identify the second set of processing devices 286 that is available for immediate, or close to immediate, execution of the processing job 211. The first set of processing devices 284 and the second set of processing devices 286 may each include one or more processing devices.

The identification of the first set of processing devices 284 and the second set of processing devices 286 by the processing device identification module 282 may occur in parallel. In another embodiment, the first set of processing devices 284 may be identified before or after the second set of processing devices 286 is identified so that the two identification processes occur in series.

The processing device identification module 282 may then identify an available set of processing devices 288 that are included in both the first set of processing devices 284 and the second set of processing devices 286. Of the processing devices in the available set of processing devices 288, the processing device identification module 282 may identify the destination processing device 208 having the lowest load. The processing device identification module 282 may also use the user parameters 248 or the processing job parameters 246 to determine the destination processing device 208 in the available set of processing devices 288. In the case in which the processing device identification module 282 fails to find any processing device in one of the first set of processing devices 284 or the second set of processing devices 286, then the processing device identification module 282 may attempt to find the destination processing device 208 in the other of the first set of processing devices 284 or the second set of processing devices 286.

Upon identifying the destination processing device 208, the process manager 244 may initiate the processing job 211 at the destination processing device 208 so that processed data 262 may be outputted by the destination processing device 208. In the example in which the processing job 211 includes a file for conversion, the processed data 262 may be a file converted in accordance with the processing job parameters 246 or the user parameters 248. The processed data 262 may then be sent to the user interfacing device 202, the process manager 244, or any other data processing device. For example, if the processed data 262 is a converted file, the user interfacing device 202 may receive the converted file for further use by the user 254.

Upon successful execution of the processing job 211 at the destination processing device 208, the process manager 244 may receive confirmation from the destination processing device 208 that the processing job 211 was successfully executed. In response to receiving this confirmation of successful execution of the processing job 211, the process manager 244 may initiate a notification on the user interfacing device 202 that the processing job 211 has been successfully executed.

In some cases, the destination processing device 208 may fail to properly execute the processing job 211 for a variety of reasons. In one embodiment, a diagnostic and notification engine 290 may determine a cause for the failure of the processing job 211 to properly execute. The diagnostic and notification engine 290, or an application in the user interfacing device 202, may analyze the cause of failure that is determined by the diagnostic and notification engine 290 and determine a suggested action for overcoming the cause of failure. For example, the processing job parameters 246 may indicate that the processing job 211 includes a file that should be converted to a particular format and size. If the processing device identification module 282 is unable to locate any processing device on which this operation may be performed for any reason, the processing device identification module 282 may notify the diagnostic and notification engine 290 of the failure or the cause of the failure. The user interfacing device 254 may then be notified of the failure or cause of the failure, and the user 254 may be prompted to change or loosen the processing job parameters 246. For example, if no processing device can be identified with the processing capacity to perform the processing job 211, the user 254 may change or loosen the processing job parameters 246 to reduce the processing requirements of the processing job 211. The diagnostic and notification engine 290 may also send the user 202 a suggested action, such as particular changes to the processing job 211, for facilitating the successful execution of the processing job 211.

In another example, the user interfacing device 202 may analyze the processed data 262 to ensure that the processing job 211 has been properly executed. For example, if the processing job 211 includes a file for conversion, the user interfacing device 202 may check the converted file to ensure that the file has been properly converted to the correct format, size, etc. If not, the user 254 may resubmit, cancel, or modify the processing job 211.

In another example, the destination processing device 208 or the available set of processing devices 288 may have become unavailable before the processing job 211 could be executed, or the process manager 244 may have lost a data connection with the destination processing device 208. In this case, the diagnostic and notification engine 290 may inform the user 254 of such failure. The diagnostic and notification engine 290 may also suggest to the user 254 to resubmit the processing job 211 at a later time. At this point, the user 254 may decide to change the processing job parameters 246 or even cancel the processing job 211 altogether. The process manager 244 may also wait for a user response for a predetermined time, and resubmit the processing job 211 to a different request processing server upon expiration of the predetermined time. The diagnostic and notification engine 290 may also suggest to the user 250 that the processing job 211 should be submitted to a request processing server other than the one on which the process manager 244 is being implemented.

In another example, only a portion of the processing job 211 may have been executed by the destination processing device 208, while the remainder of the processing job 211 is unable to be executed for any reason. In this case, the diagnostic and notification engine 290 may inform the user 254 of the partial failure and suggest that the remainder of the processing job 211 be executed without re-executing the completed portion of the processing job 211. In one embodiment, if the user 254 does not respond within a predetermined time, the processing job 211 will be resubmitted to a different request processing server than the one on which the process manager 244 is being implemented.

In another example, the processing job parameters 246 may indicate a preferred completion time for the processing job 211, but no processing devices may be identifiable that are able to execute the processing job 211 within or at the preferred completion time. In this case, the diagnostic and notification engine 290 may notify the user 254 that no processing device will be available at or around the preferred completion time. The user 254 may then be presented with the option to change the preferred completion time, or even cancel the processing job 211 altogether. In addition to the examples given above, other causes of failure for the processing job 211 to execute at the destination processing device 208 are possible, and the illustrative embodiments may incorporate these as well.

Referring to FIG. 6, an illustrative embodiment of a process that may be executed by the process manager 244 in FIG. 3 includes receiving a processing job associated with a set of processing job parameters (step 301). The process determines a processing job priority for the processing job based on the set of processing job parameters (step 305).

The process determines whether a destination processing device capable of executing the processing job is available (step 307). If the process determines that a destination processing device capable of executing the processing job is not available, the process determines whether to retry finding a destination processing device (step 309). If the process determines to retry finding the destination processing device, the process returns to step 307. If the process determines not to retry finding a destination processing device, the process terminates.

Returning to step 307, if the process determines that a destination processing device capable of executing the processing job is available, the process determines if the processing job is ready for execution on the destination processing device based on the processing job priority (step 311). If the process determines that the processing job is ready for execution based on the processing job priority of the processing job, the process initiates execution of the processing job on the destination processing device to form processed data, such as a converted file (step 313).

If the process determines that the processing job is not ready for execution based on the processing job priority of the processing job, the process waits until the processing job is ready for execution (step 315). For example, in process 315, the process may analyze the execution order that has been determined based on processing job priorities of pending processing jobs, and wait until the processing job is due to be scheduled based on this execution order. When the processing job is ready to be executed, the process initiates execution of the processing job on the destination processing device (step 313).

The process then transfers the processed data to a destination computing device, such as a user interfacing device, a request processing server, or other device (step 317). Step 317 may also be performed by the destination processing device or the user interfacing device. The process then terminates.

Figure 7:
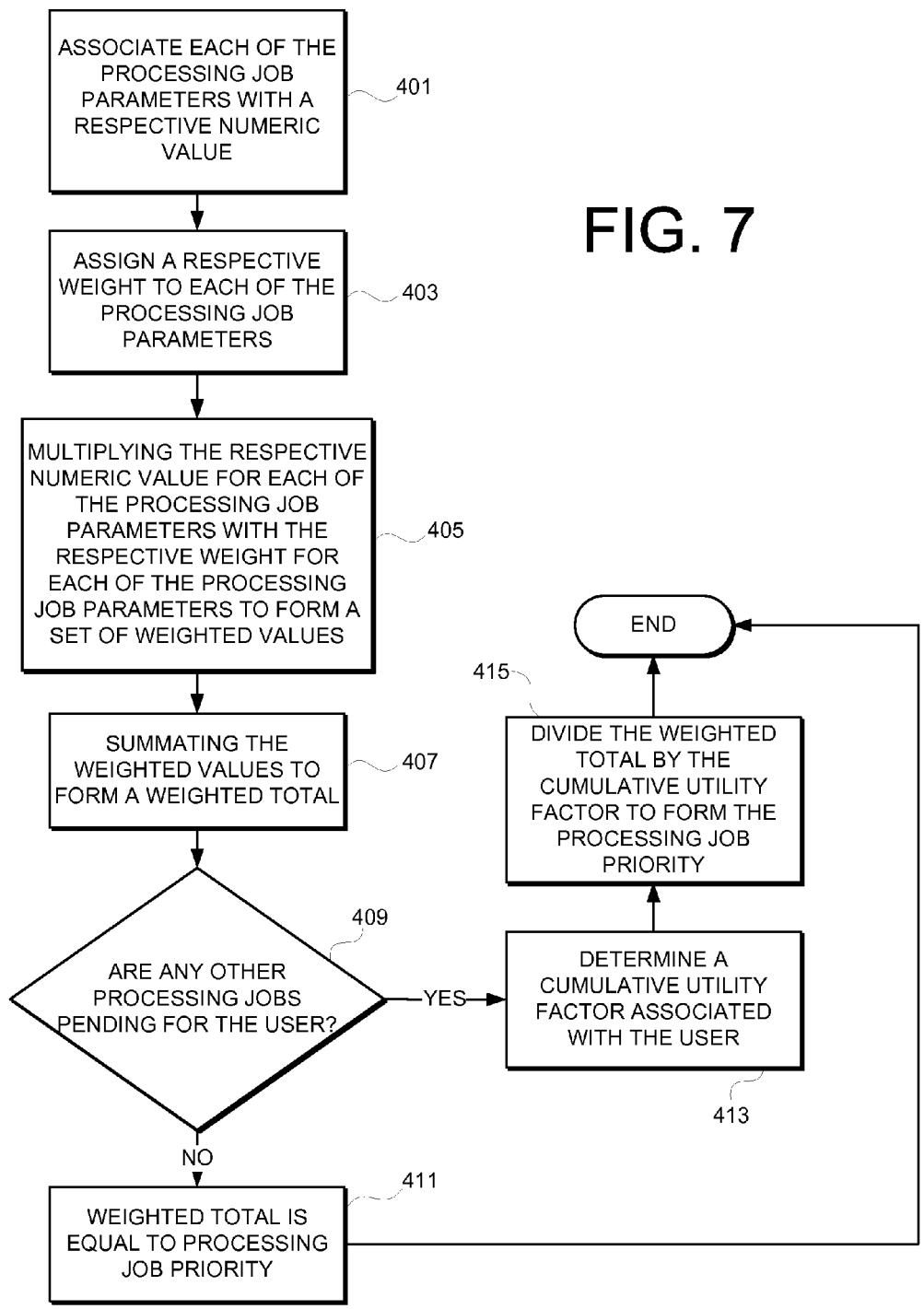
FIG. 7 is a schematic flowchart of a process for determining a processing job priority according to an illustrative embodiment.

Referring to FIG. 7, an illustrative embodiment of a process for determining a processing job priority for a processing job, such as the process performed in step 305 of FIG. 6, may include associating each of the processing job parameters with a respective numeric value (step 401). The process includes assigning a respective weight to each of the processing job parameters (step 403).

The process includes multiplying the respective numeric value for each of the processing job parameters with the respective weight for each of the processing job parameters to form a set of weighted values (step 405). The process includes summating the weighted values to form a weighted total (step 407). The process includes determining if there are other processing jobs pending for the user (step 409). If the process determines that there are no other processing jobs pending for the user, the process determines that the weighted total is equal to the processing job priority (step 411). The process then terminates.

Returning to step 409, if the process determines that there are other processing jobs pending for the user, the process determines a cumulative utility factor associated with the user (step 413). The process then divides the weighted total by the cumulative utility factor to form the processing job priority (step 415). The process then terminates.

Figure 8:
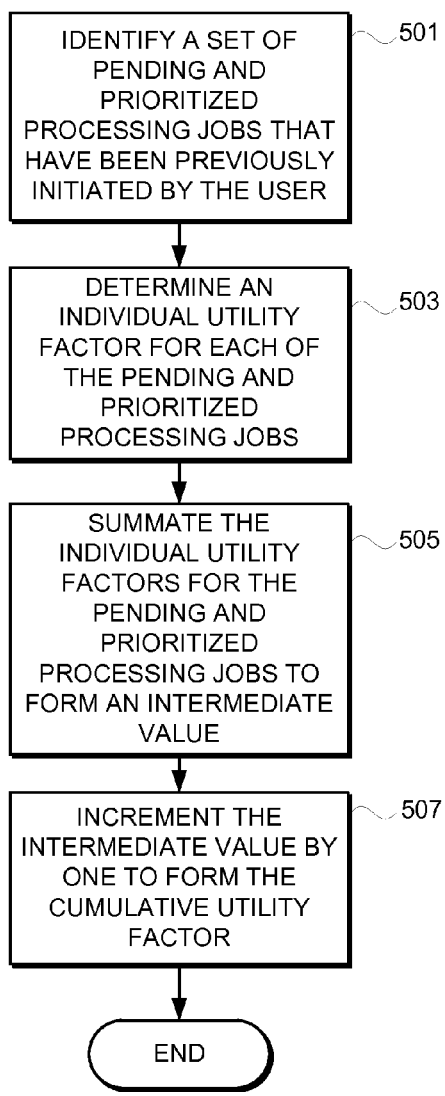
FIG. 8 is a schematic flowchart of a process for determining a cumulative utility factor according to an illustrative embodiment.

Referring to FIG. 8, an illustrative embodiment of a process for determining a cumulative utility factor, such as that performed by step 413 in FIG. 7, includes identifying a set of pending and prioritized processing jobs that have been previously initiated by the user (step 501). The process determines an individual utility factor for each of the pending and prioritized processing jobs (step 503). The process summates the individual utility factors for the pending and prioritized processing jobs to form an intermediate value (step 505). The process increments the intermediate value by one (1) to form the cumulative utility factor (step 507). The process then terminates.

Figure 9:
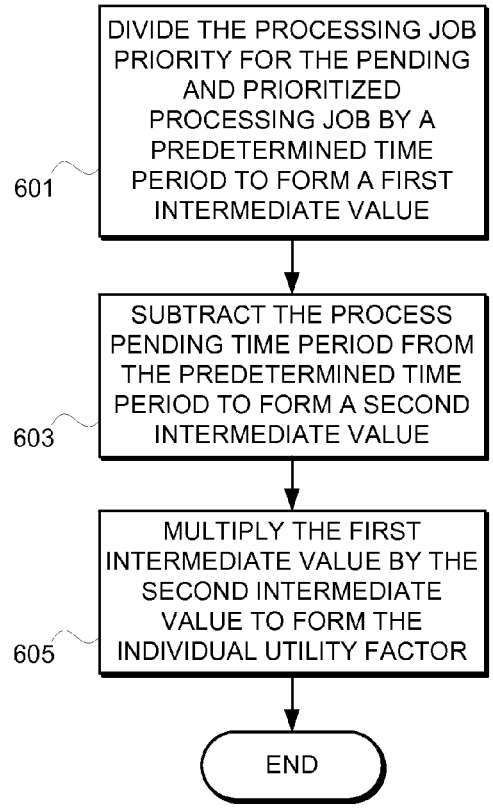
FIG. 9 is a schematic flowchart of a process for determining an individual utility factor according to an illustrative embodiment.

Referring to FIG. 9, an illustrative embodiment of a process for determining an individual utility factor, such as that performed by step 503 in FIG. 8, may include dividing the processing job priority for the pending and prioritized processing job by a predetermined time period to form a first intermediate value (step 601). The process subtracts the process pending time period from the predetermined time period to form a second intermediate value (step 603). The process multiplies the first intermediate value by the second intermediate value to form the individual utility factor (step 605). The process then terminates.

Figure 10:
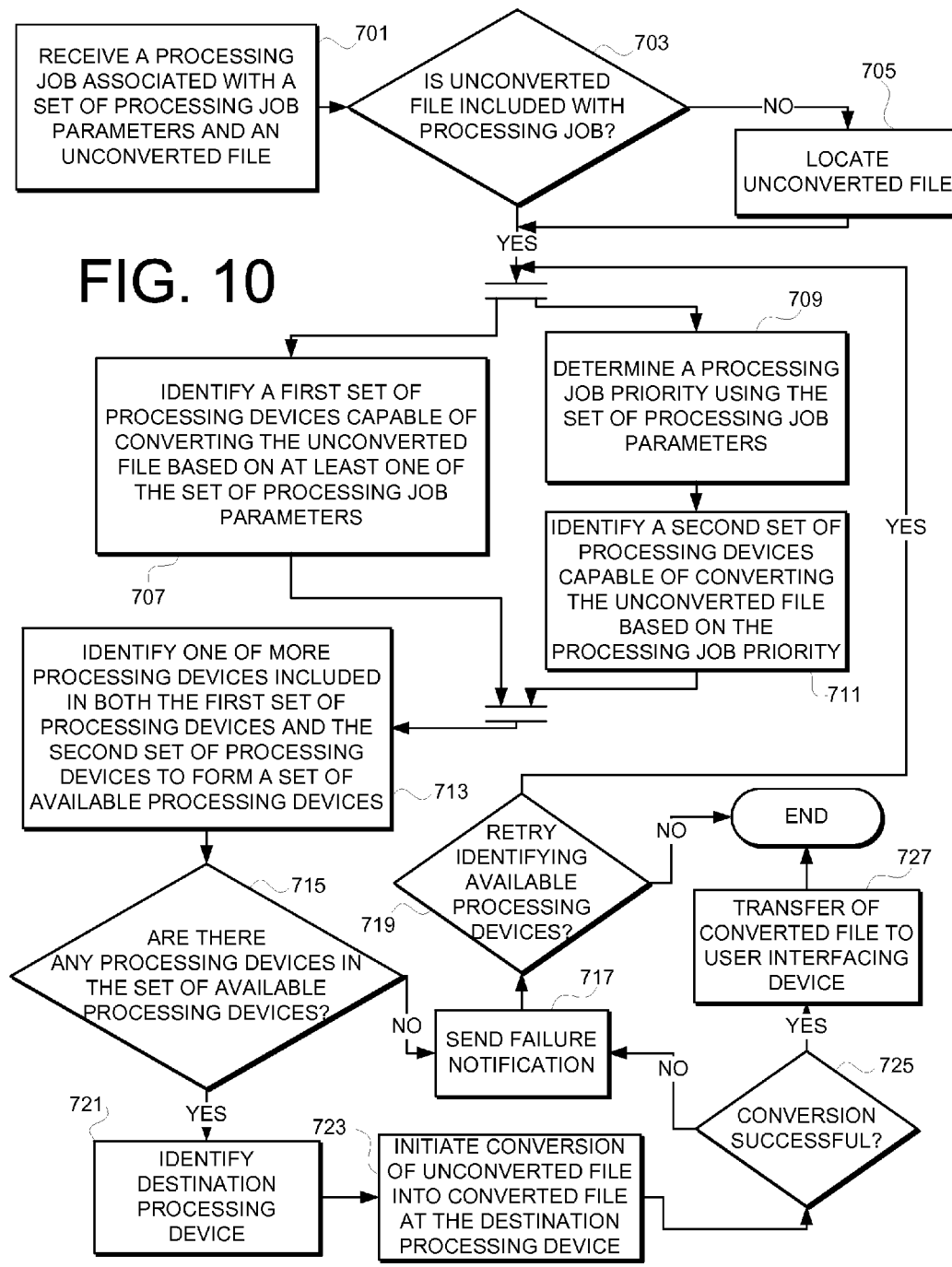
FIG. 10 is a schematic flowchart of a process for managing the execution of processing jobs according to an illustrative embodiment.

Referring to FIG. 10, an illustrative embodiment of a process that may be executed by the process manager 244 in FIG. 3 includes receiving a processing job associated with a set of processing job parameters and an unconverted file (step 701). The process determines whether the unconverted file is included with the processing job (step 703). If the process determines that the unconverted file is included with the processing job, the process proceeds to steps 707 and 709. Returning to step 703, if the process determines that the unconverted file is not included with the processing job, the process locates the unconverted file (step 705). For example, the process may attempt to locate the unconverted file on a request processing server, a user interfacing device, the Internet, or any computing device. The process then proceeds to steps 707 and 709.

Steps 709 and 711 may be executed in parallel with step 707, as illustrated by the flowchart. However, in another embodiment, steps 709 and 711 may be executed in series with step 707. In step 707, the process identifies a first set of processing devices capable of converting the unconverted file based on at least one of the set of processing job parameters. In steps 709 and 711, the process determines a processing job priority using the set of processing job parameters, and identifies a second set of processing devices capable of converting the unconverted file based on the processing job priority.

The process identifies one or more processing devices included in both the first set of processing devices and the second set of processing devices to form a set of available processing devices (step 713). The process determines if there are any processing devices in the set of available processing devices (step 715). If the process determines that there are no processing devices in the set of the available processing devices, then the process sends a failure notification (step 717). The process then determines whether to retry identifying available processing devices (step 719). If the process determines not to retry identifying available processing devices, the process terminates. Returning to step 719, if the process determines to retry identifying available processing devices, the process returns to steps 707 and 709.

Returning to step 715, if the process determines that there are available processing devices in the set of available processing devices, the process identifies a destination processing device within the set of available processing devices (step 721). The process initiates conversion of the unconverted file into a converted file at the destination processing device (step 723). The process determines whether the conversion was successfully executed (step 725). If the process determines that the conversion was not successful, the process proceeds to step 717. Returning to step 725, if the process determines that the conversion was successful, the process transfers the converted file to the user interfacing device (step 727). The process then terminates.

Figure 11:
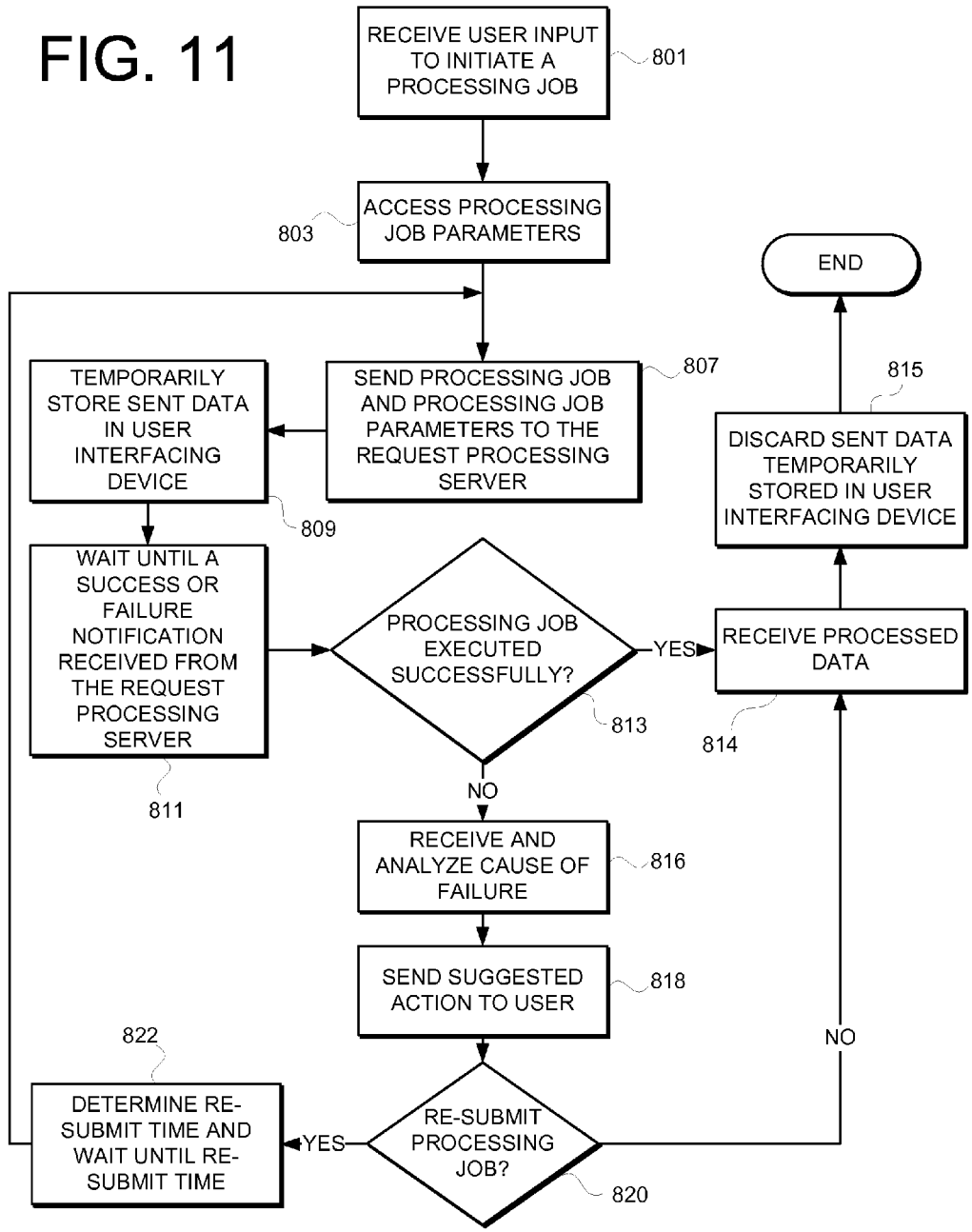
FIG. 11 is a schematic flowchart of a process for execution by a user interfacing device that initiates processing jobs.

Referring to FIG. 11, an illustrative embodiment of a process that may be implemented on a computing device, such as the user interfacing devices 102 in FIG. 1 or the user interfacing device 202 in FIG. 3, includes receiving user input to initiate a processing job (step 801). The process accesses processing job parameters (step 803). The process sends the processing job and the processing job parameters to the request processing server (step 807).

The process temporarily stores the sent data in the user interfacing device (step 809). The process waits until a success or failure notification is received from the request processing server (step 811). The process determines whether the processing job was executed successfully (step 813). In one non-limiting example, receipt of a converted file notifies the user interfacing device that the processing job was successfully executed. If the process determines that the processing job was successfully executed, the process may receive processed data (step 814) and discard the sent data that is temporarily stored in the user interfacing device (step 815). The process then terminates Returning to step 813, if the process determines that the processing job was not successfully executed, the process receives and analyzes the cause of failure (step 816). In this embodiment, a diagnostic and notification engine, such as the diagnostic and notification engine 290 in FIG. 3, may be located in the user interfacing device initiating the processing job.

The process sends a suggested action to the user (step 818). The process determines whether to resubmit the processing job (step 820). If the process determines not to re-submit the processing job, the process proceeds to step 814. Returning to step 820, if the process determines to re-submit the processing job, the process determines a re-submit time and waits until the re-submit time (step 822). The process then returns to step 807.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

Figure 12:
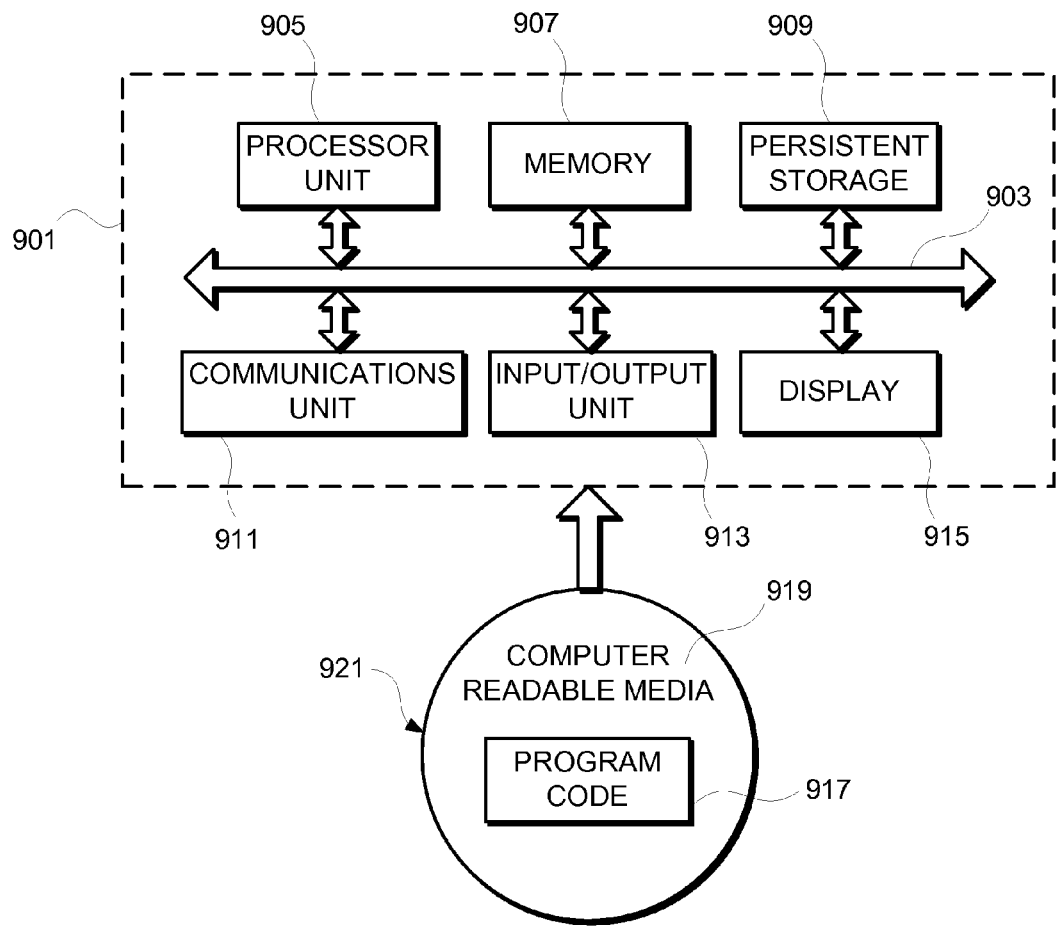
FIG. 12 is a schematic, block diagram of a data processing system in which the illustrative embodiments may be implemented.

Referring to FIG. 12, a block diagram of a data processing system 901 is shown in which illustrative embodiments may be implemented. In one embodiment, the data processing system 901 is an example of a request processing server, such as the request processing server 110 in FIG. 1, in which a process manager, such as the process manager 244 in FIG. 3, may be implemented. In another embodiment, the data processing system 901 is a user interfacing device, such as one of the user interfacing devices 102 in FIG. 1 or the user interfacing device 202 in FIG. 3. Computer-usable program code or instructions implementing the processes used in the illustrative embodiments may be located on the data processing system 901. The data processing system 901 includes a communications fabric 903, which provides communications between a processor unit 905, a memory 907, a persistent storage 909, a communications unit 911, an input/output (I/O) unit 913, and a display 915.

The processor unit 905 serves to execute instructions for software that may be loaded into the memory 907. The processor unit 905 may be a set of one or more processors or may be a multi-processor core, depending on the particular implementation. Further, the processor unit 905 may be implemented using one or more heterogeneous processor systems in which a main processor is present with secondary processors on a single chip. As another illustrative example, the processor unit 905 may be a symmetric multi-processor system containing multiple processors of the same type.

The memory 907, in these examples, may be, for example, a random access memory or any other suitable volatile or non-volatile storage device. The persistent storage 909 may take various forms depending on the particular implementation. For example, the persistent storage 909 may contain one or more components or devices. For example, the persistent storage 909 may be a hard drive, a flash memory, a rewritable optical disk, a rewritable magnetic tape, or some combination of the above. The media used by the persistent storage 909 also may be removable. For example, a removable hard drive may be used for the persistent storage 909.

The communications unit 911, in these examples, provides for communications with other data processing systems or communication devices. In these examples, the communications unit 911 may be a network interface card. The communications unit 911 may provide communications through the use of either or both physical and wireless communication links.

The input/output unit 913 allows for the input and output of data with other devices that may be connected to the data processing system 901. For example, the input/output unit 913 may provide a connection for user input through a keyboard and mouse. Further, the input/output unit 913 may send output, such as a processing job, to a processing device. In the case in which the data processing system 901 is a cellular phone, the input/output unit 913 may also allow devices to be connected to the cellular phone, such as microphones, headsets, and controllers. The display 915 provides a mechanism to display information to a user, such as a graphical user interface.

Instructions for the operating system and applications or programs are located on the persistent storage 909. These instructions may be loaded into the memory 907 for execution by the processor unit 905. The processes of the different embodiments may be performed by the processor unit 905 using computer-implemented instructions, which may be located in a memory, such as the memory 907. These instructions are referred to as program code, computer-usable program code, or computer-readable program code that may be read and executed by a processor in the processor unit 905. The program code in the different embodiments may be embodied on different physical or tangible computer-readable media, such as the memory 907 or the persistent storage 909.

Program code 917 is located in a functional form on a computer-readable media 919 and may be loaded onto or transferred to the data processing system 901 for execution by the processor unit 905. The program code 917 and the computer-readable media 919 form computer program product 921 in these examples. In one embodiment, the computer program product 921 is a process manager, such as the process manager 244 in FIG. 3. In this embodiment, the data processing system 901 may be any server, and the program code 917 may include computer-usable program code capable of receiving a processing job associated with a set of processing job parameters. The processing job may be sent from a user interfacing device associated with a user. The program code 917 may also include computer-usable program code capable of determining a processing job priority for the processing job using the set of processing job parameters, identifying a destination processing device to execute the processing job, and initiating execution of the processing job at the destination processing device to form processed data in response to determining to execute the processing job based on the processing job priority.

In another embodiment, the program code 917 may include computer-usable program code capable of receiving a processing job associated with an unconverted file and a set of processing job parameters. The processing job may be sent from a user interfacing device associated with a user. The program code 917 may also include computer-usable program code capable of determining a processing job priority based on the set of processing job parameters, identifying a destination processing device capable of converting the unconverted file using the processing job priority, initiating conversion of the unconverted file into a converted file at the destination processing device, and receiving the converted file.

In one example, the computer-readable media 919 may be in a tangible form, such as, for example, an optical or magnetic disc that is inserted or placed into a drive or other device that is part of the persistent storage 909 for transfer onto a storage device, such as a hard drive that is part of the persistent storage 909. In a tangible form, the computer-readable media 919 also may take the form of a persistent storage, such as a hard drive or a flash memory that is connected to the data processing system 901. The tangible form of the computer-readable media 919 is also referred to as computer recordable storage media.

Alternatively, the program code 917 may be transferred to the data processing system 901 from the computer-readable media 919 through a communication link to the communications unit 911 or through a connection to the input/output unit 913. The communication link or the connection may be physical or wireless in the illustrative examples. The computer-readable media 919 also may take the form of non-tangible media, such as communication links or wireless transmissions containing the program code 917.

The different components illustrated for the data processing system 901 are not meant to provide architectural limitations to the manner in which different embodiments may be implemented. The different illustrative embodiments may be implemented in a data processing system including components in addition to or in place of those illustrated for data processing system 901. Other components shown in FIG. 12 can be varied from the illustrative examples shown.

As one example, a storage device in the data processing system 901 is any hardware apparatus that may store data. The memory 907, the persistent storage 909, and the computer-readable media 919 are examples of storage devices in a tangible form.

In another example, a bus system may be used to implement the communications fabric 903 and may be comprised of one or more buses, such as a system bus or an input/output bus. Of course, the bus system may be implemented using any suitable type of architecture that provides for a transfer of data between different components or devices attached to the bus system. Additionally, the communications unit 911 may include one or more devices used to transmit and receive data, such as a modem or a network adapter. Further, a memory may be, for example, the memory 907 or a cache such as found in an interface and memory controller hub that may be present in the communications fabric 903.

The principles of the present invention can take the form of an entirely hardware embodiment, an entirely software embodiment, or an embodiment containing both hardware and software elements. In one embodiment, the invention is implemented in software, which includes but is not limited to, firmware, resident software, microcode, and other computer readable code.

Furthermore, the principles of the present invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A method for managing execution of processing jobs, the method comprising:
   receiving a processing job associated with a set of processing job parameters, the processing job sent from a user interfacing device associated with a user;
   determining a processing job priority for the processing job using the set of processing job parameters, wherein the processing job priority comprises a weighted value to determine an impact for each of the set of processing job parameters, the weighted value for each of the set of processing job parameters comprises a numeric value and a weight;
   determining a cumulative utility factor for a set of pending and prioritized processing jobs initiated by the user during a predetermined time period by determining an individual utility factor for each of a set of pending and prioritized processing jobs initiated by the user;
   identifying a destination processing device to execute the processing job; and
   initiating execution of the processing job at the destination processing device to form processed data in response to determining to execute the processing job based on the processing job priority and cumulative utility factor.

2. The method of claim 1, wherein the processing job is associated with an unconverted file, and initiating execution of the processing job comprises initiating conversion of the unconverted file into a converted file, further comprising:
   sending the converted file to the user interfacing device.

3. The method of claim 1, wherein the processing job is associated with an unconverted file, and initiating execution of the processing job comprises initiating conversion of the unconverted file into a converted file, further comprising:
   determining that the converted file has been converted according to one or more of the set of processing job parameters; and
   sending the converted file to the user interfacing device.

4. The method of claim 1, wherein the set of processing job parameters comprises a size to which a file associated with the processing job should be converted.

5. The method of claim 1, wherein the set of processing job parameters comprises an indication of whether a service processing the processing job is a paid service or free service.

6. The method of claim 1, wherein the set of processing job parameters comprises a proximity of the user interfacing device to a particular server.

7. The method of claim 1, wherein the set of processing job parameters comprises a plurality of zones associated with the user interfacing device, each of the plurality of zones corresponding to a range of distance from a processing device.

8. The method of claim 1, wherein the at least one user-defined processing job parameter comprises a specified file format, a specified file size, or both.

9. A data processing system, comprising:
   a bus system;
   a memory connected to the bus system, wherein the memory includes a set of instructions; and
   a processing unit connected to the bus system, wherein the processing unit executes the set of instructions to:
     receive a processing job associated with an unconverted file and a set of processing job parameters, the processing job sent from a user interfacing device associated with a user,
     determine a processing job priority based on the set of processing job parameters, wherein the processing job priority comprises a weighted value to determine an impact for each of the set of processing job parameters, the weighted value for each of the set of processing job parameters comprises a numeric value and a weight, the processing job parameters comprising at least one user-defined processing job parameter,
     determine a cumulative utility factor for a set of pending and prioritized processing jobs initiated by the user during a predetermined time period by determining an individual utility factor for each of a set of pending and prioritized processing jobs initiated by the user,
     identify a destination processing device capable of converting the unconverted file using the processing job priority and the cumulative utility factor,
     initiate conversion of the unconverted file into a converted file at the destination processing device, and
     receive the converted file.

10. The data processing system of claim 9, wherein the destination processing device is one of a set of available processing devices each having a respective load, the respective load of each of the set of available processing devices being an amount of time remaining for the respective available processing device to complete execution of processing jobs scheduled for the respective available processing device, and wherein the set of instructions to identify the destination processing device further comprises instructions to identify the destination processing device having a lowest load.

11. The data processing system of claim 9, wherein one of the set of processing job parameters is a preferred completion time, and wherein the set of instructions to identify the destination processing device further comprises instructions to identify the destination processing device capable of converting the unconverted file by the preferred completion time.

\* \* \* \* \*